Aug. 26, 1941.    F. STONEBERG    2,253,540
GAS CUTTING APPARATUS
Filed June 24, 1939    3 Sheets-Sheet 1

Inventor
Fred Stoneberg
By Mann, Brown &Co. Attys.

Aug. 26, 1941.  F. STONEBERG  2,253,540
GAS CUTTING APPARATUS
Filed June 24, 1939  3 Sheets-Sheet 2
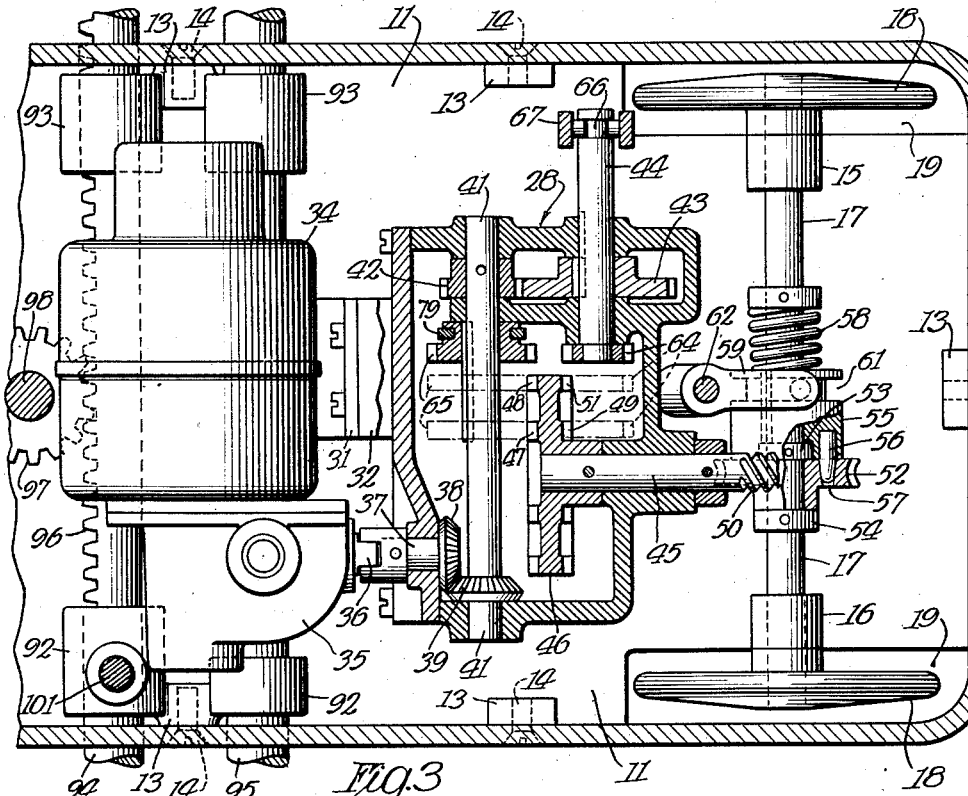
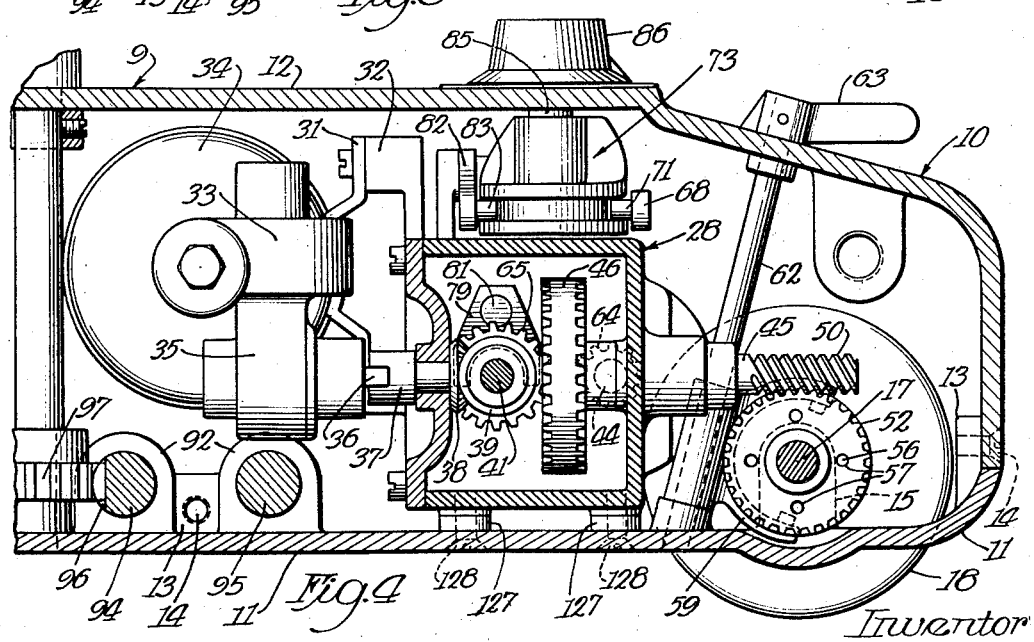
Inventor
Fred Stoneberg
By Mann, Brown & Co.
Attys.

Aug. 26, 1941.   F. STONEBERG   2,253,540
GAS CUTTING APPARATUS
Filed June 24, 1939   3 Sheets-Sheet 3
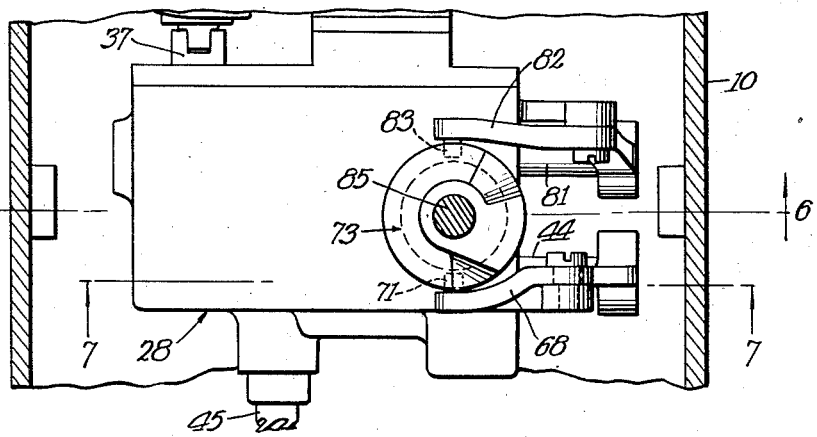
Fig.5
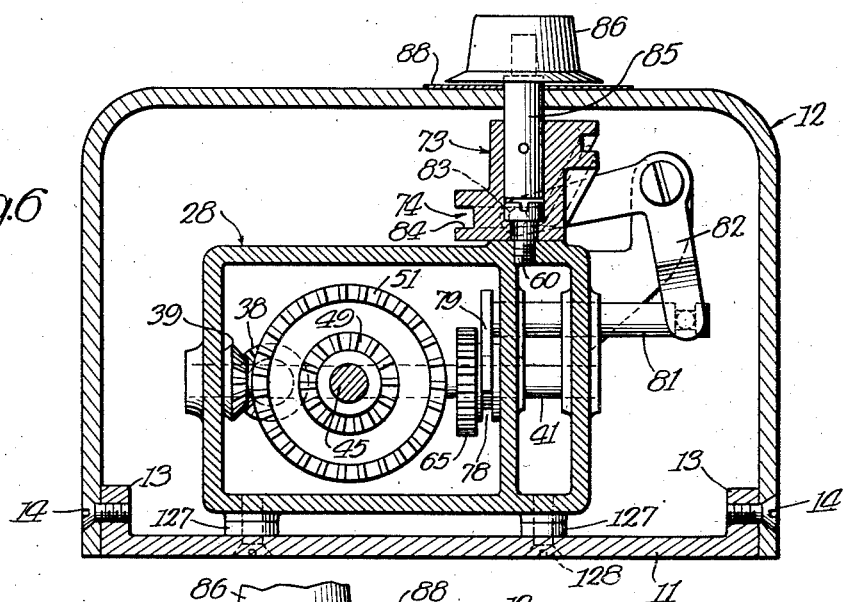
Fig.6
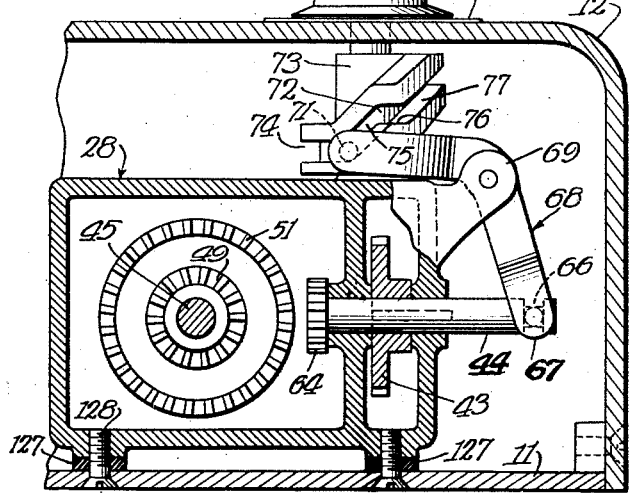
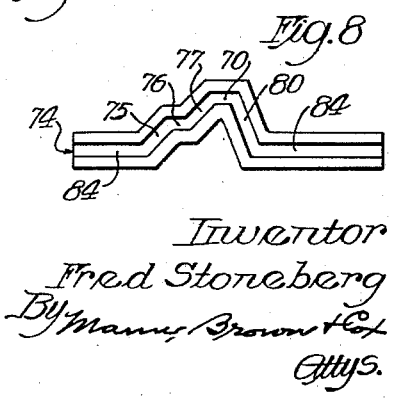
Fig.7
Fig.8
Inventor
Fred Stoneberg
By Mann, Brown & Co
Attys.

Patented Aug. 26, 1941

2,253,540

UNITED STATES PATENT OFFICE 2,253,540

GAS CUTTING APPARATUS

Fred Stoneberg, Chicago, Ill., assignor to Gaso Equipment Co., a corporation of Illinois Application June 24, 1939, Serial No. 281,055

10 Claims. (Cl. 266—23)

This invention relates to gas cutting apparatus and more particularly to the movable carriage type.

One of the objects of the invention is the provision of a new and improved gas cutting apparatus having novel change speed mechanism.

Another object of the invention is the provision of a gas cutting device having new and improved means for supporting the torch holding mechanism together with cushioning means for supporting the operating mechanism.

A further object of the invention is the provision of a new and improved means for manually operating the change speed mechanism of the apparatus.

Another object of the invention is the provision of a new and improved means for causing a smooth, even operation of the transmission mechanism.

A still further object of the invention is the provision of a new and improved means for obtaining fine adjustments for controlling the speed of the carriage.

Another object of the invention is the provision of a new and improved gas gutting apparatus that is simple in construction, easily assembled, and one in which the operating mechanism is readily accessible for replacement and for repairs.

Other and further objects and advantages of the invention will appear from the following description, taken in connection with the accompanying drawings, in which—

Fig. 3 is a horizontal section in top plan;

Fig. 4 is a longitudinal vertical section of the forward portion of the device;

Fig. 5 is a horizontal section through a portion of the apparatus showing the change speed cam device;

Fig. 6 is a section on the line 6—6 of Fig. 5;

Fig. 7 is a section on the line 7—7 of Fig. 5; and

Fig. 8 shows the developed cam path shown more or less diagrammatically.

Figure 1:
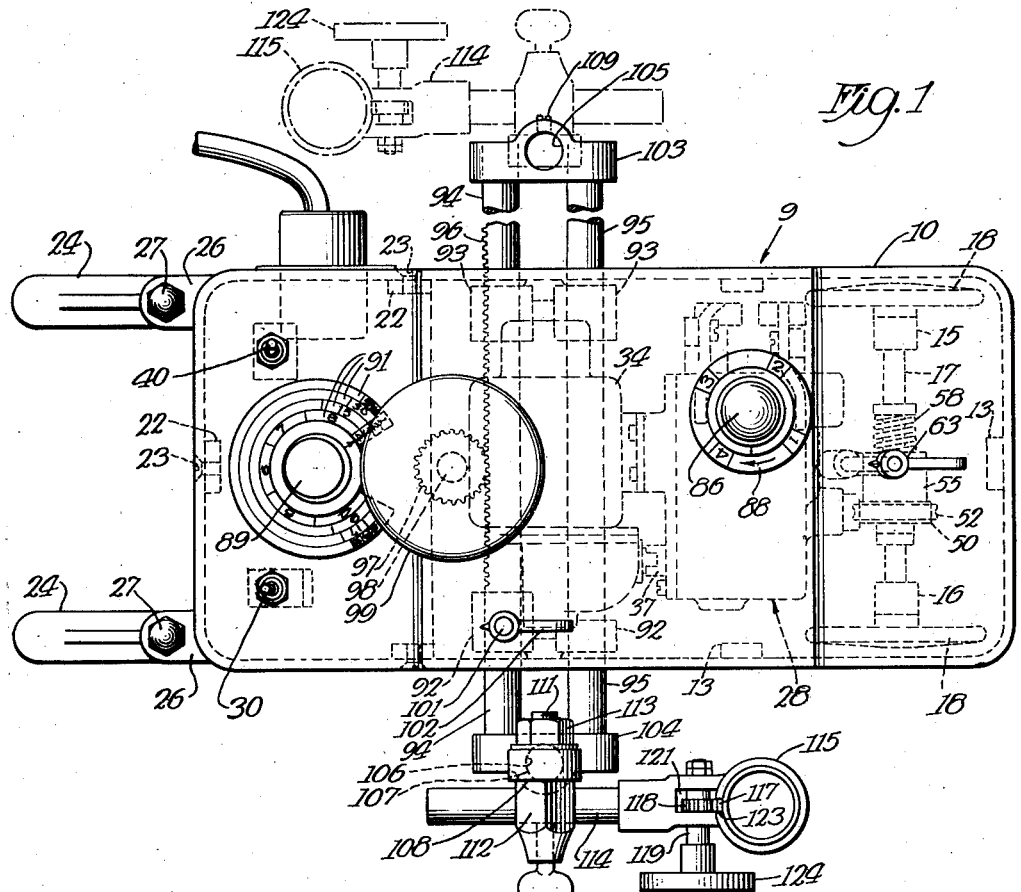
Fig. 1 is a top plan view of the device, with parts broken away.

Referring now to the drawings, the reference character 9 designates a gas cutting apparatus, including a carriage 10, which comprises what may be termed a bottom plate member or chassis frame 11, see Figs. 4 and 6, and on which is mounted a hollow body portion, housing or casing 12. The plate 11 is provided with upstanding lugs 13 around its periphery to which the casing or body portion is detachably connected as by means of screws or bolts 14, Fig. 6 The forward portion of the plate 11 is provided at the sides thereof with upstanding brackets or lugs 15 and 16 within which is journaled the axle 17, as shown in Figs. 3 and 4 of the drawings. The axle 17 has the wheels 18 rigidly connected thereto and these wheels are within the casing or body portion 12 and extend down through the openings or notches 19 in the plate or chassis frame 11 for engaging a surface for propelling the apparatus in the usual manner.

Figure 2:
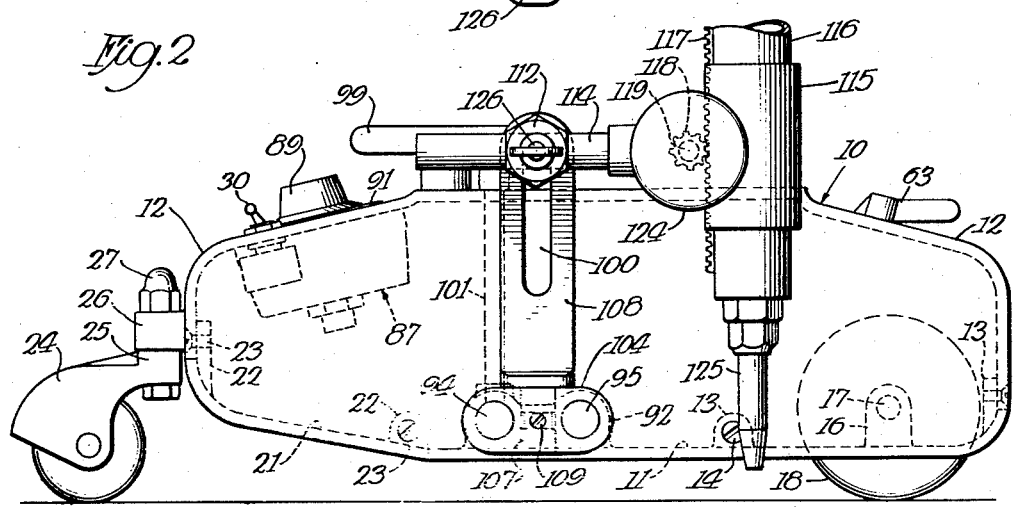
Fig. 2 is a side elevation thereof, with parts broken away.

The plate or chassis frame 11 is in two parts, the rear portion 21, see Fig. 2 being detachably connected to the sides of the body portion or shell 12 as by means of the screws 23, which extend through the casing and are threaded into openings in lugs 22 on the plate section 21, Fig. 2. By removing the plate 21, access may be had to the wiring, as will presently appear.

Mounted on the rear end of the body portion or casing 12, at each side thereof, is a caster 24. The caster 24 is provided with a shank 25 which is pivotally connected to a lug or projection 26 on the rear portion of the casing 12 as by means of the bolt 27.

Suitable mechanism is provided for propelling the carriage at variable speeds, as will now be described. A gear casing or box 28 is carried by the plate 11 and is provided for housing the transmission and change speed mechanism. Rigidly mounted on the rear wall 29 of this gear casing 28 is a bracket 31. The bracket 31 is detachably secured to a boss 32 on an upward extension on the wall 29 and is rigidly secured to a motor mounting 33 at its free end. The motor mounting 33 carries a motor 34 and reducing gear 35 of any well known construction. Since the motor 34 and the reducing gear 35 are of the usual or any well known construction, it is not thought necessary to show and describe the same in detail.

The motor is supplied with an electric current, the circuit of which is opened and closed by a switch 30 extending to the upper side of the body 11. A switch for reversing the motor is shown at 40 in Fig. 1.

The reducing gear 35 operates a power shaft 36 having a flat end portion which engages in a corresponding recess in a stub shaft 37 which is journaled in the rear wall 29 of the gear casing 28. The inner or forward end of the stub shaft 37 is provided with a bevel gear 38, Fig. 3, which in turn meshes with a bevel gear 39 rigidly mounted on a countershaft 41 which is journaled in the end walls of the gear casing 28 and extends transversely to the carriage. A pinion 42 of the speed reducing gear is keyed on the opposite end of the shaft 41 and meshes with the gear 43 slidably keyed to a change speed shaft 44 slidably mounted in that end of the gear casing 28 that is adjacent to the pinion 42. A driven shaft 45, Figs. 3 and 4, is journaled in the forward wall of the gear box 28 and has keyed to its lower end a master or crown gear 46 which has inner and outer concentric rows of teeth 47 and 48, respectively, on its rear side and similar inner and outer concentric rows of teeth 49 and 51 on its forward side. The forward end of the driven shaft 45 is provided with a worm 50 which engages a corresponding worm gear 52 loosely mounted on the axle 17 at the forward end of the carriage. The gear 52 is held between two collars 53 and 54 keyed to the axle 17.

A suitable clutch 55, having clutch pins or teeth 56 for engaging corresponding openings 57 in the worm gear 52, is provided for clutching the axle 17 to the worm gear 52. The clutch member 55 is slidably keyed to the axle 17 and is held in normal clutch position by a spring 58. The clutch is adapted to be operated by a clutch fork 59 engaging a groove 61 in the clutch member and having a shaft 62 provided with a handle 63 above the casing 12 for moving the clutch against the compression of the spring 58 for releasing the worm gear when it is desired.

The inner end of the shaft 44 is provided with a pinion or spur gear 64 which is adapted to engage the outer row of gear teeth 51 when the gear 64 is moved inwardly to obtain one speed or to engage the inner row 49 for obtaining a higher speed, as will presently be described.

The countershaft 41 has slidably mounted thereon a pinion or spur gear 65 which is slidably mounted on an intermediate portion of the shaft 41 and is adapted to be slid inwardly into mesh with the outer row of gear teeth 48 on the master or crown gear 46 or into mesh with the inner row of gear teeth 47 on the gear 46 for obtaining a still higher speed.

Suitable means are provided for shifting the gears 64 and 65 for obtaining the four different speeds of which the change speed mechanism is capable. In the form of the construction selected to illustrate one embodiment of the invention, the shifting mechanism is so mounted that it may be operated by the rotation of a single shifting shaft or member in one direction for obtaining progressively higher or lower speeds, depending on which direction it is turned. As shown, the shaft 44, see Fig. 7, has its outer end provided with a groove 66 which is adapted to be engaged by a shifting fork 67 on the lower end of the bell crank 68 pivoted to a lug 69 on the gear box, as clearly shown in Fig. 7. The upper end of the bell crank 68 is provided with a shifting pin 71 which is adapted to engage a camway, groove or passage 74 formed in the cam member 73. The camway 74 is provided with a dwell 84, Figs. 7 and 8, which extends a greater distance than 180° about the cam and then has an incline 75 which, when the cam is turned, causes the pin 71 to travel up the incline 75 thereby forcing the shaft 44 inwardly causing the pinion or spur gear 64 to engage the outer row of teeth 51 on the master or crown gear 46.

On turning the cam still further in the same direction, it will pass along a dwell 76 which holds the gears 51 and 64, Figs 3 and 7, in mesh for the lowest speed and then up an incline 77 which will force the shaft 44 inwardly to cause the gear 64 to engage the teeth 49 on the inner row of the crown gear for obtaining second speed.

Suitable means are also provided for sliding the pinion or spur gear 65 along the shaft for causing the teeth thereof to engage first the teeth 48 and then the teeth 47, Fig. 3, of the master crown gear. This is accomplished by the mechanism shown in Fig. 6 which is similar to that already described. In this construction, the gear 65 is provided with an extended hub portion having a groove 78 which is adapted to be engaged by a yoke 79 carried by a shifting bar 81 which in turn is adapted to be operated by a bell crank 82. The bell crank 82 has its upper end provided with a pin 83, Figs. 5 and 6, which is adapted to engage in the groove 74 in a manner already described with reference to the pin 71. The groove 74 of the cam is provided with the dwell 84 which, as mentioned above, is greater than 180° so that both pins 71 and 83 may simultaneously occupy the dwell or horizontal portion of the groove so as to hold the change speed mechanism in neutral. The groove 74, after forming the incline 77 and a short dwell 70, drops down at a sharp angle to the dwell 84, as shown at 80, Fig. 8. The cam 73 is rotatably mounted on a headed stud 60 seated in a counterbore in the cam and threaded into box 28, Fig. 6. The cam is rotated by a shaft 85 extending through the top wall of the casing 12 and having mounted thereon a handle, button or knob 86 by which the same may be turned for shifting the change speed mechanism.

In the operation of the device, the handle, button or knob 86 is turned right-handed which, when the parts are in the position shown in Fig. 7, will first move the teeth of the gear 64 into mesh with the teeth 46 of the crown gear for obtaining lowest or fourth speed. The drive is then from the motor through the power shaft 36, Fig. 3, stub shaft 37, gears 38, 39, shaft 41 and the reducing gears 42, 43, shaft 44, gear 64 and the outer teeth 51 of the forward side of the crown gear, shaft 45, worm 50, worm gear 52, and axle 17 for propelling the wheels 18. Further movement of the knob 86, in the same direction, will cause the gear 64 to engage the inner teeth 49 of the crown gear on the forward side as explained above. The drive then will be in the same manner as described above but since there are less teeth in the row 49 than in the row 51, the speed will be somewhat higher thereby obtaining third speed.

On turning the knob still further, the pin 71 will pass down the incline 80 into the dwell 84 which will cause the bell crank 68 to withdraw the gear 64 to the position shown in Fig. 7. The parts are then again in neutral position.

On turning the button still further to the right, the pin 83 on the bell crank 82 will engage first the incline 75, then the incline 77 for shifting the gear 65 in a manner similar to the shifting of the gear 64 for obtaining second and first which are progressively higher speeds than those obtained by the gears 64 and 49.

In second speed, the drive will be through the counter shaft 41, gear 65, directly to the gear teeth 48 of the crown gear 46. In other words, the reduction caused by the use of the gears 42 and 43 will be eliminated. On turning the knob still further, the gear 65 will be caused to engage the teeth 47 thereby attaining the highest speed possible by the use of the change speed mechanism.

When the change speed mechanism is at either one of these speeds, intermediate speeds between that one and the next speed obtainable by the gear mechanism may be obtained by operating the rheostat 87 for changing the speed of the motor. By means of these arrangements, extremely small variations in speed may be obtained by manipulating the knob 86 and the rheostat 87.

The knob 86 may be provided with an indicator operating over a scale 88 for indicating the different speeds, as shown in Fig. 1. Likewise, the clutch handle 63 may be provided with a pointer for indicating the off and on position of the clutch. The motor 34 is of the reversible change speed type and is adapted to be controlled by a suitable rheostat 87 having the knob 89 turning over a plurality of scales 91 for indicating the speed of the carriage. There are four scales corresponding to the four different speeds that may be obtained by the mechanical change speed mechanism and these scales are so calibrated that they will indicate the speed of the carriage for any position of the change speed mechanism and the adjustment of the rheostat.

Appropriate mechanism is provided for supporting the gas cutting nozzle. As shown, the plate 11 is provided with upstanding apertured lugs or projections 92 and 93 at opposite sides of the carriage. These lugs are preferably, though not necessarily, integral with the plate 11 and the openings on one side are in axial alignment with the openings of the corresponding lugs or sleeves on the other side. Slidably mounted in the openings of the lugs 92 and 93 is a pair of supporting bars 94 and 95.

The bar 94 has provided on one edge thereof, a rack 96 which is adapted to be engaged by a pinion 97 on the lower end of a shaft 98, Fig. 1, the upper end of which is provided with a wheel or handle 99 for operating the shaft for moving the torch supporting bars 93, 96 transversely of the carriage. The wheel or handle member 99 is above the casing 12 of the carriage so that it is accessible to the operator. A set screw 101 is threaded into one of the sleeves 92 and is adapted to engage the bar 94 for fixing it in any adjusted position. The set screw 101 has its upper end extending above the casing 12 and is provided with a handle 102 for operating the set screw. Heads 103 and 104, Fig. 1, are rigidly mounted on the outer ends of the bars 94 and 95 and these heads are provided with the vertical openings 105 and 106 for receiving the lower reduced cylindrical end 107 of a torch supporting standard 108.

The standard 108 is adapted to be turned or rotated and is held in angular adjustment by a set screw 109 which engages the shank or reduced portion 107 of the standard. The upper end of the standard 108 is provided with a vertical slot 100 in which is slidably and rotatably mounted the threaded shank 111 of a holding bracket 112. The bracket 112 is adapted to be held in any angular or vertical adjustment on the standard by a nut 113. The bracket 112 is provided with a transverse opening for receiving the outer end of a torch supporting arm 114, the opposite end of which has rigidly attached thereto a sleeve 115 through which a torch holder 116 is adapted to slide. The torch holder 116 is provided with a rack 117 which is adapted to be engaged by a pinion 118 mounted on a shaft 119 extending across a recess 121 formed in the arm 114. The pinion 118 is rigidly mounted on the shaft 119 and is adapted to engage the rack 117 which extends outwardly through a slot 123 in the sleeve 115. The hand wheel 124 is mounted on the outer end of the shaft 119 for rotating the pinion for raising and lowering the torch holder 116. The torch holder 116 is adapted to have attached thereto, at its lower end, a torch nozzle 125 which is of the usual or any well known construction.

It will thus be seen that the torch may be adjusted vertically or through various angles in different planes. For instance, the torch may be swung in a horizontal plane by rotating the standard 108, first loosening the set screw 109. The torch may be raised or lowered by the use of the slot and bracket 112 and may also be rotated in a vertical plane longitudinally of the vehicle by loosening the nut 113 and turning the bracket 112 along with the torch about the reduced portion 111 as an axis. The torch supporting arm 114 is rotatably mounted in the bracket 112 and may be held in adjusted position by a set screw 126. By loosening the set screw 126, the torch may be swung in a vertical plane transversely of the carriage. In addition to these movements, the torch may be raised and lowered by the hand wheel 124 or it may be moved toward or away from the carriage by turning the hand wheel 99, see Fig. 1. If desired, the standard 108, together with the torch supporting arm and torch, may be moved to the opposite side of the carriage and attached to the head 103 by inserting the reduced portion of the standard in the opening 105 and securing the same in position by the set screw 109 as shown in dotted lines in Fig. 1.

It is desirable that the vibration of the torch supporting mechanism be reduced to a minimum during the operation of the device. In order to accomplish this result, the slide rods 94 and 95 are mounted as low as possible on the carriage and the major portion of the operating mechanism is resiliently supported from the carriage. As shown, the brackets for supporting the slide rods 94 and 95 are mounted directly on the plate 11 beneath the center of gravity of the carriage and the gear case or box 28, which contains the change speed mechanism and a greater portion of the transmission and to which the motor 34 is rigidly connected and supported, is resiliently mounted on this same plate 11. As shown, this is accomplished by mounting the gear box or casing 28 on rubber feet or blocks 127 which are held in position by suitable screws or the like 128.

It will thus be seen that in the operation of the device, the crown gear 46, being heavy or massive, will function as a flywheel for the motor and transmission and the rubber blocks 127 will reduce to a minimum the vibration of the motor and transmission to the carriage. The slide rods 94 and 95, being mounted on the chassis frame of plate 11, below the center of gravity of the carriage, with no connection to the motor or transmission, except indirectly through the rubber blocks 127, will hold the torch without undue vibration.

By the use of a reversible variable speed motor in connection with the change speed mechanism, any speed desired between the maximum and minimum may be obtained, either forwardly or backwardly. For instance, with the gear ratios as shown, any speed between four and sixty inches per minute may be obtained. This may, of course, be varied by changing the gear ratios.

By removing the screws 14 and 23 at the sides of the carriage and the one engaging the front bracket 13, removing the slide rods 94 and 95, and the knobs from the top of the carriage, the casing 12, with the casters 24 and plate 21, may be removed for exposing the motor, transmission and change speed device for inspection, replacement or repairs.

It is thought from the foregoing, taken in connection with the accompanying drawings, that the construction and operation of my device will be apparent to those skilled in the art and that changes in size, shape, proportion and detail may be made without affecting the spirit and scope of the appended claims.

I claim as my invention:

1. In a gas cutting apparatus, a carriage, means including change speed mechanism for propelling said carriage, said mechanism comprising a driven shaft, a heavy gear on said shaft, a plurality of driving shafts, intermeshing gears on said shafts, and gears on certain of said shafts movable, one at a time, into and out of mesh with said heavy gear for propelling said carriage at different speeds, said heavy gear, during its operation, functioning as a flywheel for balancing the motor and acquiring smoothness of operation of the propelling mechanism.

2. In a gas cutting apparatus, a carriage, change speed mechanism for operating said carriage, a reversible, variable speed motor for operating said mechanism, said change speed mechanism comprising a massive crown gear having a plurality of concentric rows of gear teeth on each side thereof, a spur gear on each side of said crown gear, means for moving each spur gear into mesh with any one row of concentric teeth on the side of the crown gear adjacent said spur gear, and means for preventing the meshing of both of said spur gears at the same time with the teeth of said crown gear.

3. In a gas cutting apparatus, a carriage, a motor mounted on said carriage, means including a driven shaft for propelling said carriage, a motor driven change speed mechanism for operating said driven shaft from said motor, said mechanism comprising a master gear having a plurality of rows of concentric teeth on opposite sides thereof, a pinion at each side of said master gear for alternately meshing with the rows of teeth on the adjacent side of said gear for operating said master gear at different speeds, means for operating said pinions from said motor, means for preventing simultaneous meshing of both of said pinions with said gear, and a single shifting member for moving each of said pinions into and out of mesh with the teeth of said rows.

4. In a gas cutting apparatus, a carriage having a wheeled axle, a motor, transmission mechanism between said motor and axle for propelling said carriage, a torch supporting slide arranged to slide transversely of the carriage with at least one of its ends extending laterally from the carriage, means for mounting said slide on the lower portion of said carriage below the center of gravity thereof, and means for supporting a torch from said slide outwardly of said carriage.

5. In a gas cutting apparatus, a carriage having a chassis plate, a wheeled axle supporting one end of said plate, means, including wheels, supporting the opposite end of said plate, a housing detachably mounted on said plate, a gear casing mounted on said plate within said housing, a motor removably connected to and carried by said gear casing within said housing, transmission and change speed mechanism mounted in said gear casing and operatively connected to said motor for operating said carriage at different speeds, said mechanism comprising a massive gear functioning as a flywheel, rubber blocks supporting said gear casing from said plate, a gas cutting torch, and means rigidly connected to said plate in close proximity to the same supporting said torch below the center of gravity of said carriage.

6. In a gas cutting apparatus, a carriage, means for propelling the same at variable speeds, a torch, means for adjustably mounting the same on said carriage, said means comprising supporting bar means slidably mounted on said carriage below its center of gravity, a standard rotatably mounted on said bar means and extending vertically therefrom, a bracket mounted on said standard to rotate about a horizontal pivot, an arm slidably and rotatably mounted in said bracket, and a torch holder slidably mounted in said bracket.

7. In a gas cutting apparatus, a carriage comprising a hollow body, a wheeled axle for supporting the forward end of said body, caster means for supporting the rear end of said body portion, a torch, means for supporting said torch on said carriage, a motor, change speed mechanism for propelling said axle from said motor, said mechanism comprising a massive crown gear having two concentric rows of gear teeth on each side, slidable gears adapted to mesh one only at a time with said rows of teeth in a predetermined order, cam means for shifting said slidable gears, and a single knob for rotating said cam means for changing the gear ratio of said mechanism.

8. In a gas cutting apparatus, a carriage, means including a motor for propelling said carriage, said means comprising a change speed mechanism, a box for housing said mechanism, means for mounting said motor on said box, rubber blocks for supporting said box on said carriage, said mechanism comprising a massive gear, a torch, means for adjustably supporting the torch on the carriage, said last named means comprising a slide member slidable transversely of the carriage in a horizontal plane below the center of gravity of said carriage, a standard rotatable about a vertical axis mounted on the outer end of said slide, a torch supporting arm, means slidable vertically on said standard for supporting said arm, means holding said arms in adjusted position angularly about a horizontal axis, and means including a pivot and a rack and pinion for raising and lowering said torch and to move said torch about a horizontal pivot extending transversely to said arm, said massive gear functioning as a flywheel for rendering the movement of said motor and mechanism smooth and even, whereby said torch will be moved along with said carriage with a minimum of vibration.

9. In a gas cutting apparatus, a carriage, means for propelling the same, a torch, means for adjustably supporting the same on said carriage, said last-named means comprising a slide slidably mounted on the lower portion of said carriage, a torch, means for adjustably mounting said torch on said carriage, said means comprising a standard mounted on said slide and rotatable about a vertical axis, a bracket rotatable about a vertical axis, a bracket rotatable about a horizontal axis, a torch holder arm carried by said bracket and rotatable about a horizontal axis at a right angle to the rotating axis of said bracket, a torch holder carried by said arm, means for slidably adjusting said holder on said arm, and means extending to the upper surface of said carriage for slidably adjusting said slide transversely across said carriage.

10. In a gas cutting apparatus, a carriage comprising a wheeled axle, a hollow body, a chassis plate supported at its front end on said axle and detachably connected to said body, a pair of casters, means for supporting the rear ends of said body and plate by said casters, a motor, transmission and change speed mechanism between said motor and axle for propelling the carriage, a box for containing said change speed mechanism, a slide slidably mounted on said plate, torch adjusting and supporting means carried by said plate, a torch carried by said last-named means, means for rigidly mounting said motor on said box, said mechanism comprising a massive gear functioning as a flywheel, and rubber means for supporting said box from said plate whereby a minimum of vibration will be communicated to said torch from said motor and mechanism.

FRED STONEBERG.

CERTIFICATE OF CORRECTION.

Patent No. 2,253,540. August 26, 1941.

FRED STONEBERG.

It is hereby certified that error appears in the printed specification of the above numbered patent requiring correction as follows: Page 4, second column, lines 73 and 74, claim 9, strike out the words and comma "a bracket rotatable about a vertical axis,"; and that the said Letters Patent should be read with this correction therein that the same may conform to the record of the case in the Patent Office.

Signed and sealed this 7th day of October, A. D. 1941.

(Seal)

Henry Van Arsdale,
Acting Commissioner of Patents.